United States Patent [19]
Moncrief et al.

[11] Patent Number: 5,660,263
[45] Date of Patent: Aug. 26, 1997

[54] OBLIQUE INFEED SYSTEM AND LOCATING WEDGE

[75] Inventors: Frank Moncrief, Acworth; Bobby Lee Miller, Jr.; Gary J. Vulgamore, both of Marietta, all of Ga.

[73] Assignee: Riverwood International Corporation, Atlanta, Ga.

[21] Appl. No.: 383,344

[22] Filed: Feb. 3, 1995

[51] Int. Cl.⁶ .................................................. B65G 47/12
[52] U.S. Cl. ........................................................ 198/445
[58] Field of Search ................................... 198/445, 446

[56] References Cited

U.S. PATENT DOCUMENTS 3,710,918  1/1973  Babunovic ........................... 198/445

FOREIGN PATENT DOCUMENTS 3613724  10/1987  Germany ............................. 198/445
4345425  12/1992  Japan .................................. 198/445

*Primary Examiner*—Joseph E. Valenza
*Attorney, Agent, or Firm*—Tsaf, Vaughan & Kerr

[57] ABSTRACT

An infeed system for a packaging machine directs a nested mass of articles in a downstream direction between two side rails. A locating-wedge affixed to one of the side rails moves the nested mass of articles to a position where a segment line of the nested mass is aligned with a lane divider. As a result, a group of articles in the nested mass is gently separated into a first group which moves along one side of the lane divider in a first lane and a second group which moves along the other side of the lane divider. The articles in the second group are directed into other lanes sequentially formed from the one side rail to the other side rail and are positioned relative to the lane dividers with locating wedges affixed to the lane dividers. Each of the locating wedges has a ramped surface for laterally moving a nested mass of articles into the proper position relative to an associated lane divider and has a side surface for allowing a group of the articles in the nested mass to move along the one side of the lane divider. The locating wedges may also have a plateau area for maintaining a nested mass of articles at the proper position as the articles travel in the downstream direction toward the lane divider.

26 Claims, 2 Drawing Sheets

OBLIQUE INFEED SYSTEM AND LOCATING WEDGE

FIELD OF THE INVENTION

The invention relates to an apparatus and method for separating a plurality of articles into groups of articles. A second aspect of the invention relates to a locating wedge for use in separating articles into groups of articles.

BACKGROUND OF THE INVENTION

Various types of packaging systems have been designed to package articles, such as cans or bottles, into a unitary container, such as a paperboard carton. Typically, the articles are grouped in some manner to correspond with the approximate container dimensions, and the article group is then transferred into the container. Frequently an insert or partition is placed between the articles in the packaged group to maintain the integrity of the articles.

Many of the known packaging infeed assemblies or systems divide a nested mass of articles into separate lanes of articles prior to placing the articles within the container. The articles are divided into separate lanes for various reasons, such as to form article groups or to drop a partition between the articles. An example of a commonly used system for dividing the articles into separate lanes is disclosed in U.S. Pat. No. 5,237,795 to Cheney et al., which includes a centrally disposed lane divider for separating an unordered mass of articles being transported along a packaging machine into two separate groups of articles. The two separate groups of articles are then divided into individual lanes of articles using a plurality of lane dividers. The lane dividers form lanes with widths approximately equal to the width of an article.

A problem with many of the prior packaging systems, including the one disclosed in Cheney et al., is that the articles are not smoothly divided into the separate lanes. Instead, because the articles are in an unordered mass, the forward tips or ends of the lane dividers often impact the front side of the advancing articles near the center of the articles, thereby violently moving or jarring the articles into the lane. As a result, the articles may become damaged during the packaging process. This problem often is exacerbated when the packaging machine is being operated at higher speeds, thereby advancing the articles faster along their paths of travel. In order to reduce the amount of damage to the articles and to minimize the resulting interruptions to the process flow, the packaging systems must operate at lower speeds, thereby lowering the efficiency of the system.

Another type of packaging system is similar to the type disclosed in Cheney et al..in that it includes a lane divider, initially centrally disposed between the side rails. Additional lane dividers sometimes are positioned rearwardly from and to each side of the initial, central lane divider. The central lane divider is positioned near the points of contact between the articles to more smoothly divide the mass of articles into two groups. Additional lane dividers, however, are positioned to form lanes with widths essentially equal to that of the articles, and so impact the front side of the advancing articles near their centers, as in the first prior art embodiment discussed above. Thus, while the mass of articles can be divided more smoothly into the first two groups, the articles thereafter are violently jarred when being divided into the individual lanes, especially at higher machine speeds. Consequently, to reduce the amount of damage to the articles, the packaging system also preferably must operate at lower speeds. Further, since the initial lane divider in this system is centrally disposed, with additional dividers to each side and rearwardly, a phenomenon occurs in which spaces between articles at least the size of one article tend to remain as the articles are advanced downstream toward the initial divider. The existence of such spaces can interrupt or prevent smooth article group division. Obviously, however, in the case of cylindrical articles, a small void between nested articles will always occur, as shown in FIGS. 2 and 3.

SUMMARY OF THE INVENTION

The invention, in one embodiment, comprises a locating wedge for use in dividing a nested mass of articles into at least two groups of articles. The locating wedge has a generally ramped surface for laterally moving the nested mass of articles into a predetermined position relative to a lane divider, and a side surface for allowing a first group of articles in the nested mass to move along one side of the lane divider, with a second group of articles moving along the opposite side of the lane divider. The locating wedge positions the nested mass of articles such that a segment line of the nested mass is aligned with the lane divider when the nested mass is at the predetermined position.

The locating wedge, in a preferred embodiment, is formed from an ultra-high molecular weight plastic, and defines a plateau area between the ramped surface and the side surface, for maintaining the nested mass of articles at the predetermined position. The locating wedge further has holes bored through the wedge for receiving fasteners that affix the locating wedge to the packaging machine. The segment line of the nested mass is defined as a line passing through midpoints of two sides of an equilateral triangle which is formed by connecting the centers of three abutting articles.

The invention, in another aspect, comprises an infeed system for separating articles flowing in a downstream direction into at least two groups of articles. The infeed System has a pair of spaced side rails disposed generally parallel to each other for directing the articles in the downstream direction, and a first lane divider spaced a predetermined distance from one of the side rails. A first locating wedge is located on one side rail slightly upstream from the first lane divider, and is intended to laterally move a nested mass of articles in a predetermined position relative to the first lane divider. When the nested mass of articles is at the predetermined position, a segment line of the nested mass is aligned with the first lane divider.

In a preferred embodiment of the infeed system, the articles are divided into a plurality of lanes sequentially from one side rail to the other side rail. Thus the assembly of the present embodiment forms an "oblique" arrangement of article dividers, as opposed to the centrally disposed initial divider discussed above. This "oblique" divider arrangement tends to cause article groups advancing towards the dividers to move relative to one another so that spaces between the articles are filled or closed. A locating wedge is positioned adjacent to each lane divider to move a nested mass of the articles to a position where a segment line of the nested mass is aligned with another lane divider. In this manner, the articles are smoothly divided into the individual lanes defined between the lane dividers. The overall packaging machine operation, therefore, can be run at much higher speeds, and still efficiently divide the advancing articles.

The invention, in a further aspect, comprises a method of separating articles into at least two groups. The method comprises the steps of forming a nested mass of articles and moving the nested mass of articles in a downstream direction between two side rails. The nested mass of articles is then positioned relative to a first lane divider such that a segment line of the nested mass is aligned with the first lane divider. The nested mass of articles is then separated by the first lane divider into a first group of articles which moves along one side of the first lane divider, and a second group of articles which moves along the opposite side of the first lane divider.

The method preferably positions the nested mass relative to the first lane divider by shifting the nested mass with a locating wedge. The method may comprise the additional steps of separating the articles into further groups with each group travelling down a separate lane defined between two lane dividers. The lanes of articles are sequentially formed from one of the side rails to the other side rail.

DETAILED DESCRIPTION OF THE PREFERRED EMBODIMENTS

Figure 1:
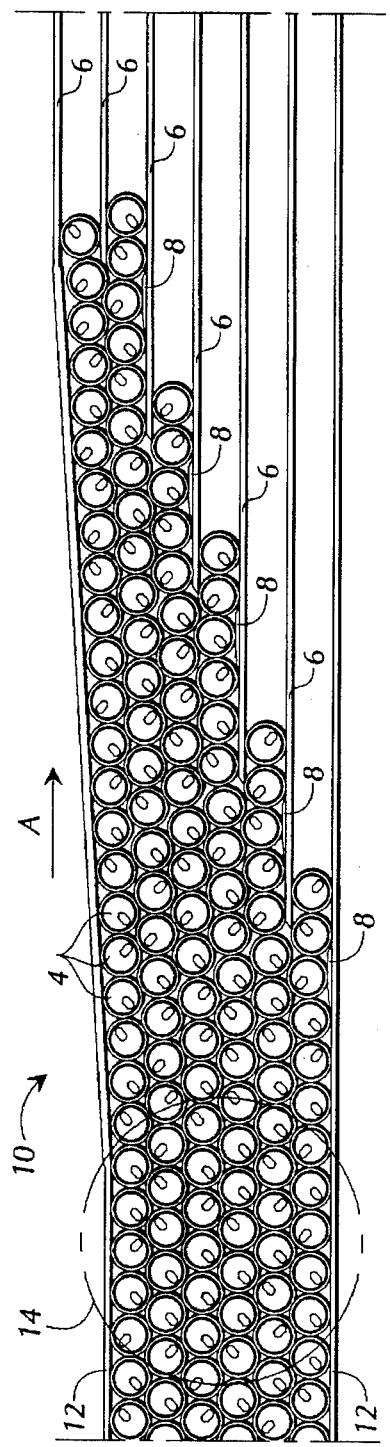
FIG. 1 is a plan view of an infeed system according to a preferred embodiment of the invention.

With reference to FIG. 1, an infeed assembly or system 10 according to a preferred embodiment of the invention receives a plurality of articles 4 for subsequent packaging into suitable containers. The infeed assembly preferably is incorporated into or used in conjunction with a machine for packaging articles, such as bottles or cans, although the infeed assembly and invention discussed herein could be used with other machines which handle or process articles that must be discretely arranged. The articles 4 are advanced by conveyor or other known means or method in a downstream direction A between a pair of upstanding side rails 12. The advancing movement of the articles 4 between said rails 12, in which the articles abut one another, as shown in FIG. 1, results in a nested mass 14 of articles 4.

Figure 2:
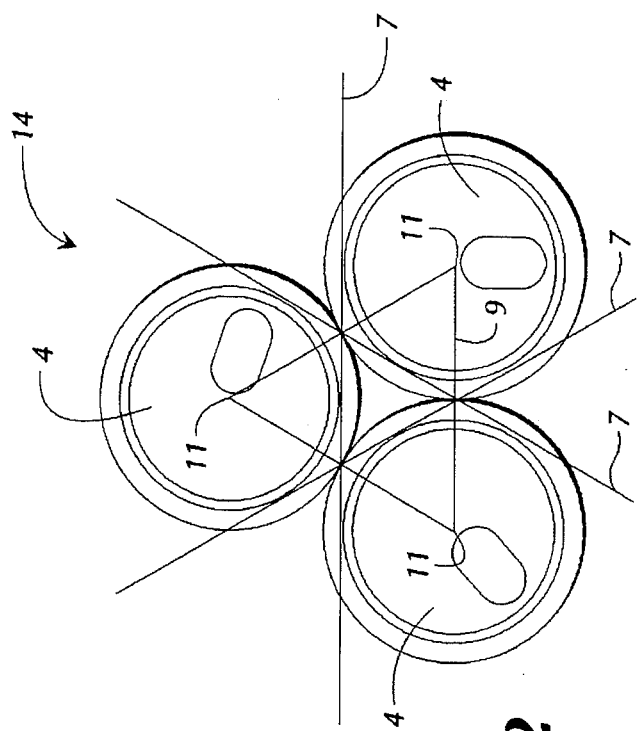
FIG. 2 is a diagram illustrating locations of segment lines for a group of three nested cans.
Figure 3:
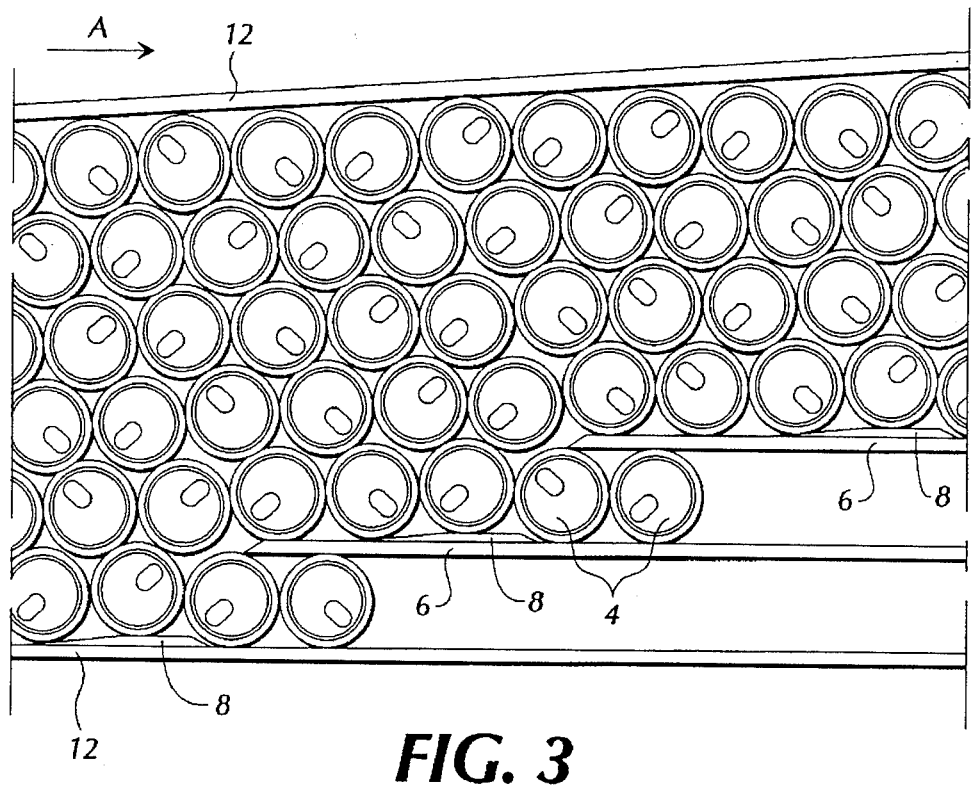
FIG. 3 is an enlarged plan view of the infeed system of FIG. 2.

A nested mass of articles 4, as shown in FIG. 2, is a set of at least three articles 4 which are standing on end and which have points of tangential contact. In this embodiment, the articles 4 are symmetrical, such as containers having cylindrical bottom portions, as bottles or cans. The geometry of a nested mass of articles is such that an equilateral triangle 9 is formed by lines extending between the centers 11 of the articles 4. As a nested mass of articles 4 moves in the downstream direction A, one side of the triangle 9 is parallel with the downstream direction A of travel. A segment line 7 is defined as a line that passes through midpoints of two sides of the triangle 9. Thus, each set of three articles 4 has three segment lines 7. The formation of a nested mass 14 of articles 4 travelling at a desired speed in the downstream direction A is within the capability of one skilled in the art and therefore will not be described further in detail.

The infeed assembly or system 10 operates by positioning a nested mass of articles 4 such that a segment line 7 is aligned longitudinally with the axis of an upstanding lane divider 6. Such lane dividers 6 are known in the art, and normally comprise a smooth sided rail of metal, plastics, or a combination of metal and plastics. When the nested article group or mass 14 is divided by the forward movement of the group against a divider 6, the articles 4 tend to be arranged into discrete lanes by moving laterally adjacent articles 4 transversely away from one another. In this transverse or lateral movement, the articles 4 collectively travel the smallest transverse distance when the lane divider 6 is aligned with a segment line 7 and, consequently, incur a smoother lateral shift with the potential for the least amount of damage to the article 4. As a result of this shifting or repositioning, a nested mass of articles 4 is smoothly separated into individual lanes of articles 4.

As shown in FIG. 1, the lane dividers 6 are evenly spaced from one another, and are staggered so as to sequentially form lanes from one upstanding side rail 12 to the other side rail 12. A locating wedge 8 is positioned adjacent to and at the forward end of each lane divider 6 for moving a nested mass of articles 4 to a predetermined position relative to the lane dividers 6. More specifically, each of the locating wedges 8 laterally moves an advancing nested mass 14 of articles to a position where a lane divider 6 is aligned with a segment line 7 of the nested mass. As a result of this placement, the articles 4 in the nested mass are smoothly divided into the separate lanes with minimal jerking or violent shifting of the articles 4.

The articles 4 separated with the infeed system 10 are preferably bottles or cans. The invention, however, is not limited to just bottles or cans, but may be used to separate other types of articles. Also, the invention may be used with articles of various Shapes, such as with articles having a polygon-shaped cross-section or articles which are not cylindrical.

When the articles 4 are separated along segment lines 7, the articles 4 are smoothly divided into the separate lanes without damaging the integrity of the article 4 or any graphics on the article 4. Further, the infeed assembly 10 operates over a range of conditions, including article back pressure, flow rate, speed, and variations in the nesting pattern, which is broader than that of known, conventional packaging infeed systems. As discussed above, the "oblique" arrangement of the dividers 6 tends to ensure that advancing articles 4 move to fill in undesirable voids between articles 4.

Figure 4A:
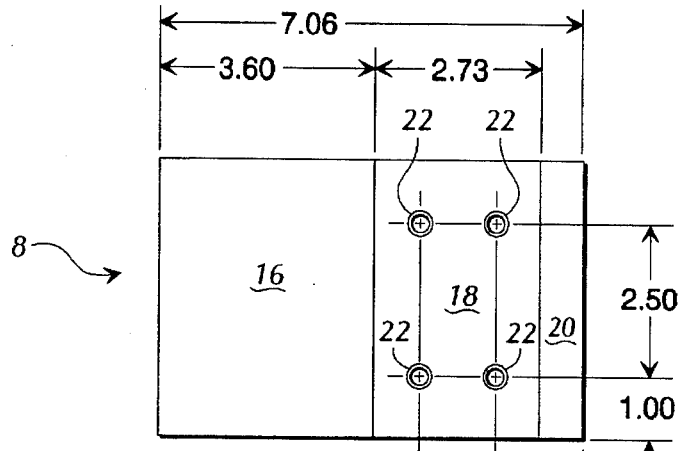
FIG. 4(A) is a side view of a locating wedge according to a preferred embodiment of the invention.
Figure 4B:
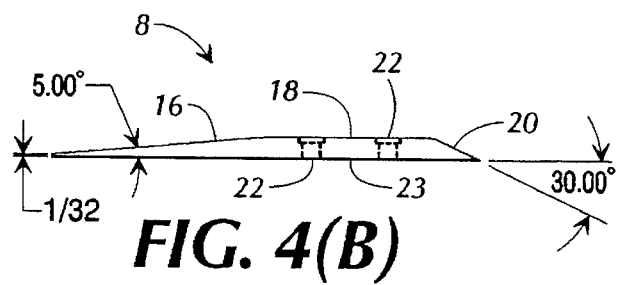
FIG. 4(B) is a plan view of the locating wedge according to the preferred embodiment of the invention.

The locating wedge 8 may be formed from any suitable material, such as an ultra-high molecular weight ("UHMW") plastic. With reference to FIGS. 4(A) and (B), each locating wedge 8 has a ramped surface 16 for moving a nested mass of articles 4 laterally to be adjacent to a surface 18 on the wedge 8. When a nested mass of articles 4 has been so moved to be adjacent to the surface 18 on the wedge 8, one lane of articles 4 is divided from the remaining mass or group of articles 4, and the remaining nested mass has been positioned so that a segment line 7 of the remaining nested mass is aligned with a second or subsequent lane divider 6 in the oblique line of lane dividers 6. The articles 4 in the remaining nested mass are then separated into the individual lanes by the subsequent lane divider 6. An angled side surface 20 of the locating wedge 8 allows the articles in the remaining nested mass to move toward the lane divider 6.

The locating wedge 8 may be mounted to the side rails 12, or side plate, or to the lane dividers 6 themselves in any suitable manner. In the embodiment shown in FIGS. 4(A) and (B), the locating wedge 8 defines a set of four holes 22 extending completely through the locating wedge 8. Bolts, metal screws, or other suitable fasteners, are passed through the holes 22 for mounting the locating wedge 8 to a side rail 12 or to a lane divider 6, and are recessed within the locating wedge 8 so as not to interfere with the flow of articles 4. The locations, number, and size of the holes 22 are not critical to the operation of the locating wedge 8 and may be changed as long as the locating wedge 8 remains securely fastened.

The example of the locating wedge 8 shown in FIGS. 4(A) and (B) is for use with a 2.606 inch diameter article, which corresponds to the size of a standard 12 ounce beverage can commonly sold in the United States. The locating wedge 8 has an overall width of 4.50 inches, a length of 7.06 inches, and a maximum thickness of 0.346 inches. The ramped surface 16 and side surface 20 are formed at angles of approximately 5.00° and 30.00° relative to a rear surface 23 of the locating wedge 8.

The size and shape of the locating wedge 8 may be modified for various reasons, such as for an article 4 having a different diameter or height, for a packaging machine operating at a different speed, or for lanes having a different width. Thus, the locating wedge 8 is not limited to the precise form disclosed. Some possible variations on the locating wedge 8 include a proportionately larger ramped surface 16, a ramped surface 16 formed at a different angle, a side surface 20 formed at a different angle, or the elimination of the plateau surface 18 so that the ramped surface 16 abuts the side surface 20. An important aspect of the invention is to size the transverse width of the locator wedge so that the nested article group is moved transversely sufficiently so that a segment line 7 is longitudinally aligned with the next or subsequent lane divider 6. Other variations in the locating wedge 8 will be apparent to those of ordinary skill in the art.

It will further be obvious to those skilled in the art that many variations may be made in the above embodiments, here chosen for the purpose of illustrating the present invention, and full result may be had to the doctrine of equivalents without departing from the scope of the present invention, as defined by the appended claims.

What is claimed is:

1. A locating wedge, for use in dividing a nested mass of articles into two groups of articles, comprising a generally ramped surface for laterally moving said nested mass of articles into a predetermined position relative to a lane divider, a side surface for allowing a first group of said articles in said nested mass to move along one side of said lane divider, with a second group of said articles moving along an opposite side of said first lane divider, and a plateau area between said ramped surface and said side surface for maintaining said nested mass of articles at said predetermined position, wherein said nested mass of articles includes a segment line aligned with said lane divider when said nested mass of articles is at said predetermined position.

2. The locating wedge as set forth in claim 1, wherein said locating wedge is formed from an ultra-high molecular weight plastic.

3. The locating wedge as set forth in claim 1, further comprising means for mounting said locating wedge to a side rail.

4. The locating wedge as set forth in claim 1, further comprising means for mounting said locating wedge to said lane divider.

5. The locating wedge as forth in claim 1, wherein said nested mass comprises three articles and said segment line passes through midpoints of two sides of an equilateral triangle formed by con centers of said articles.

6. An infeed system for separating articles flowing in a downstream direction into at least two groups of articles, comprising:

a pair of side rails disposed generally parallel with each other for directing said articles in said downstream direction;

a first lane divider spaced a predetermined distance from one of said side rails;

a first locating wedge located on said one side rail slightly upstream from said first lane divider, said first locating wedge for moving a nested mass of said articles to a predetermined position relative to said first lane divider, wherein said nested mass of articles has a segment line aligned with said first lane divider when said nested mass of articles is at said predetermined position so that a first group of articles in said nested mass moves along one side of said first lane divider and a second group of said articles in said nested mass moves along an opposite side of said first lane divider;

a second lane divider spaced said predetermined distance from said first lane divider; and a second locating wedge located on said first lane divider opposite said one side rail and slightly upstream from said second lane divider, wherein said second locating wedge is for moving said second group of articles to a position where a segment lane of a nested mass of articles is aligned with said second lane divider so as to divide said second group of articles into a third group of articles which moves along one side of said second lane divider, between said first lane divider and said second lane divider, and a fourth group of articles which moves along an opposite side of said second lane divider.

7. The infeed system as set forth in claim 6, wherein said predetermined distance is approximately equal to a width of one of said articles.

8. The infeed system as set forth in claim 6, wherein said first locating wedge has a generally ramped surface for laterally moving said nested mass of articles into said predetermined position and a side surface for allowing said first group of articles to move along said one side of said first lane divider.

9. The infeed system as set forth in claim 8, wherein said first locating wedge further comprises a plateau area between said ramped surface and said side surface for maintaining said nested mass of articles at said predetermined position.

10. The infeed system as set forth in claim 6, wherein said first locating wedge comprises means for mounting said first locating wedge to said side rail.

11. The infeed system as set forth in claim 6, wherein said second locating wedge comprises means for mounting said second locating wedge to said first lane divider.

12. The infeed system as set forth in claim 6, wherein said nested mass comprises three articles and said segment line passes through midpoints of two sides of an equilateral triangle formed by connecting centers of said articles.

13. A method of separating articles into at least two groups, comprising the steps of:

forming a nested mass of said articles;

moving said nested mass of articles in a downstream direction between a first side rail and a second side rail;

positioning a first locating wedge, said locating wedge having a ramped leading surface, on said first side rail relative to a first lane divider and passing said mass of nested articles over said ramped surface and laterally shifting the nested mass of articles toward said first lane divider in response thereto such that a segment line of said nested mass is aligned with said first lane divider, said locating wedge also including a plateau area downstream of said ramped surface, said plateau area being constructed and arranged to terminate upstream of a leading edge of said lane divider; and separating, with said first lane divider, said nested mass of articles into a first group of articles which moves along one side of said first lane divider, and a second group of articles, which moves along an opposite side of said first lane divider.

14. The method of separating articles as set forth in claim 13, further comprising the steps of:

positioning said second group of articles relative to a second lane divider such that a segment line of a second nested mass of articles is aligned with said second lane divider; and separating, with said second lane divider, said second group of articles into a third group of articles, which moves along one side of said second lane divider, between said first lane divider and said second lane divider, and a fourth group of articles, which moves along an opposite side of said second lane divider.

15. The method of separating articles as set forth in claim 13, wherein said step of positioning said nested mass of articles relative to said first lane divider comprises the step of positioning three articles such that said segment line, which passes through midpoints of two sides of an equilateral triangle formed by connecting centers of said three articles, is aligned with said first lane divider.

16. The method of separating articles as set forth in claim 13, further comprising the steps of dividing said second group of articles into further groups of articles and passing said further groups of articles down a respective number of lanes, said lanes being sequentially defined from one of said side rails to the other side rail.

17. An infeed system for separating articles moving in a downstream direction into separate lanes, comprising:

a first side rail and a second side rail disposed generally parallel with each other for directing said articles between the first and second side rails in said downstream direction;

a first lane divider spaced from said first side rail for forming a first lane between said first lane divider and said first side rail;

a second lane divider located between said first lane divider and said second side rail and downstream from said first lane divider, said second lane divider forming a second lane between said second lane divider and said first lane divider and at least a third lane between said second lane divider and said second rail, wherein said lanes are successively formed from said first side rail to said second side rail; and a first locating wedge located on said first side rail for laterally moving a nested mass of said articles to a predetermined position relative to said first lane divider and a Second locating wedge located on said first lane divider for laterally moving another nested mass of said articles to said predetermined position relative to said second lane divider.

18. The infeed system as set forth in claim 17, further comprising a third lane divider located between said second lane divider and said second side rail and downstream from said second lane divider, said third lane divider forming said third lane between said third lane divider and said second lane divider and at least a fourth lane between said third lane divider and said second rail.

19. The infeed system as set forth in claim 17, wherein said first lane divider is aligned with a segment line of said nested mass when said nested mass is moved to said predetermined position and said second lane divider is aligned with a segment line of said another nested mass when said another nested mass is moved to said predetermined position.

20. A method for feeding a mass of articles travelling in a downstream direction between a first side rail and a second side rail into a plurality of lanes, comprising the steps of:

forming a first lane between said first side rail and a first lane divider;

positioning a second lane divider downstream from said first lane divider and between said first lane divider and said second side rail;

forming a second lane between said first lane divider and said second lane divider and at least a third lane between said second lane divider and said second side rail, wherein said lanes are formed successively from said first side rail to said second side rail;

positioning a first locating wedge on said first side rail for laterally moving a nested mass of articles into a predetermined position relative to said first lane divider; and positioning a second locating wedge on said first lane divider for laterally moving another nested mass of articles into said predetermined position relative to said second lane divider.

21. The method for feeding said mass of articles as set forth in claim 20, further comprising the steps of:

positioning a third lane divider downstream from said second lane divider and between said second lane divider and said second side rail; and forming said third lane between said first third divider and said second lane divider and at least a fourth lane between said third lane divider and said second side rail.

22. The method for feeding said mass of articles as set forth in claim 20, wherein said step of positioning said first locating wedge comprises the step of aligning said first lane divider with a segment line of said nested mass and said step of positioning said second locating wedge comprises the step of aligning said second lane divider with a segment line of said another nested mass.

23. An infeed system for separating articles flowing in a downstream direction into at least two groups of articles, comprising:

a pair of side rails disposed generally parallel with each other for directing said articles in said downstream direction;

a first lane divider spaced a predetermined distance from one of said side rails; and a first locating wedge located on said one side rail slightly upstream from said first lane divider, said first locating wedge including a generally ramped surface for laterally moving a nested mass of said articles to a predetermined position relative to said first lane divider, a side surface for allowing a first group of articles to move along said one said of said first lane divider, and a plateau area between said ramp surface and said side surface for maintaining said nested mass of articles at said predetermined position;

wherein said nested mass of articles has a segment line aligned with said first lane divider when said nested mass of articles is at said predetermined position so that a first group of articles in said nested mass moves along one side of said first lane divider and a second group of articles in said nested mass moves along an opposite side of said first lane divider.

24. An infeed system for separating a nested mass of articles moving in a downstream direction into separate lanes, comprising:

first and second side rails disposed generally parallel with each other for directing the nested mass of articles in a downstream direction;

a lane divider positioned intermediate said first and said second side rails, said lane divider including a leading edge constructed and arranged to divide the nested mass of articles into a first group which moves between said first rail and said lane divider, and a second group which moves between said lane divider and said second rail; and a locating wedge disposed on said first side rail upstream of the leading edge of said lane divider, wherein said locating wedge includes a ramped surface at an upstream end thereof, an elevated side surface downstream of said ramped surface, said elevated surface being substantially parallel to said side rails, said ramped surface and said elevated surface being constructed and arranged to laterally move the nested mass of articles into a predetermined position relative to said lane divider, and a downstream angled side surface tapering from said elevated side surface back toward said first side rail and terminating upstream of said lane divider for allowing said first group of articles to move between said first rail and said lane divider.

25. A locating wedge for use with a lane divider, the lane divider having a leading edge, to divide a nested mass of articles moving in a downstream direction into a first group of articles and a second group of articles, said locating wedge comprising:

a first upstream end having a ramped surface for laterally moving the nested mass of articles into a predetermined position relative to the lane divider;

an intermediate elevated surface downstream of said ramped surface, said elevated surface extending in the downstream direction for holding the nested mass of articles in alignment with the lane divider so that the first group of articles in the nested mass of articles moves along one side of the lane divider and the second group of articles moves along the opposite side of the lane divider; and an angled side surface extending in the downstream direction from said intermediate elevated surface, wherein said angled side surface terminates upstream of the leading edge of the lane divider.

26. A method for feeding a nested mass of articles traveling in a downstream direction between a first side rail and a second side rail and dividing the nested mass of articles into at least two lanes of articles, said method comprising the steps of:

forming a first lane between the first side rail and a first lane divider;

forming a second lane between said lane divider and the second side rail;

positioning a locating wedge on said first side rail with respect to said first lane divider, said locating wedge having a leading ramped surface at an upstream end thereof, an intermediate elevated side surface downstream of said ramped surface, said elevated surface being substantially parallel to said first side rail, and a trailing angled side surface tapered from said elevated side surface toward the first side rail and terminating upstream of said first lane divider:

moving the nested mass of articles over the ramped surface into a predetermined position relative to said first lane divider;

holding the nested mass of articles in said predetermined position on said elevated surface;

dividing a first group of articles from the nested mass of articles so that the first group of articles enters said second lane and so that the second group of articles enters said first lane.

* * * * *